(12) United States Patent
Berglund et al.

(10) Patent No.: US 6,233,693 B1
(45) Date of Patent: *May 15, 2001

(54) SMART DASD SPIN-UP

(75) Inventors: Neil Clair Berglund; David Arvin Verburg, both of Kasson, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,940

(22) Filed: May 6, 1998

(51) Int. Cl.$^7$ ........................................ G06F 1/26
(52) U.S. Cl. ...................... 713/340; 711/112; 713/300
(58) Field of Search .................. 710/8–9; 713/300–340; 711/100, 111, 112

(56) References Cited

U.S. PATENT DOCUMENTS

| | | | |
|---|---|---|---|
| 4,041,467 | * | 8/1977 | Cota et al. ............................ 707/534 |
| 4,233,666 | * | 11/1980 | Walberg et al. ...................... 365/226 |
| 5,117,430 | * | 5/1992 | Berglund .............................. 370/408 |
| 5,184,025 | * | 2/1993 | McCurry et al. ...................... 307/66 |
| 5,216,343 | * | 6/1993 | Genheimer et al. ............. 318/568.18 |
| 5,483,656 | | 1/1996 | Oprescu et al. ...................... 395/750 |
| 5,488,274 | * | 1/1996 | Satoh .................................... 318/101 |
| 5,532,563 | * | 7/1996 | Kodama et al. ...................... 318/440 |
| 5,673,412 | * | 9/1997 | Kamo et al. .......................... 711/114 |
| 5,734,912 | * | 3/1998 | Okuno et al. ......................... 713/310 |
| 5,915,122 | * | 6/1999 | Tsurumi ................................ 711/101 |

FOREIGN PATENT DOCUMENTS

WO96/19764   6/1996  (WO) ................................ G06F/1/00

OTHER PUBLICATIONS

Que Corporation, Upgrading and Repairing PCs, 2nd Edition, 1992, pp. 909–915.*
"Power Sequence Control by SCSI Configuration AutoMagically Function", IBM Technical Disclosure Bulletin, vol. 40, No. 08, Aug. 1997, p. 75.
U.S. application No. 08/912,561, Berglund, filed Aug.18, 1997.*
U.S. application No. 08/912,403, Berglund et al., filed Aug. 18, 1997.*
U.S. application No. 08/912,402, Berglund et al., filed Aug. 18, 1997.*

* cited by examiner

*Primary Examiner*—Sumati Lefkowitz
(74) *Attorney, Agent, or Firm*—Christopher H. Lynt

(57) ABSTRACT

A system start-up routine is implemented to determine system device power requirements and system power capabilities, determine a maximal number of devices which can be started at one time, and start the maximal number of devices. The devices are, for example, direct access storage devices, i.e., disk drives.

20 Claims, 6 Drawing Sheets

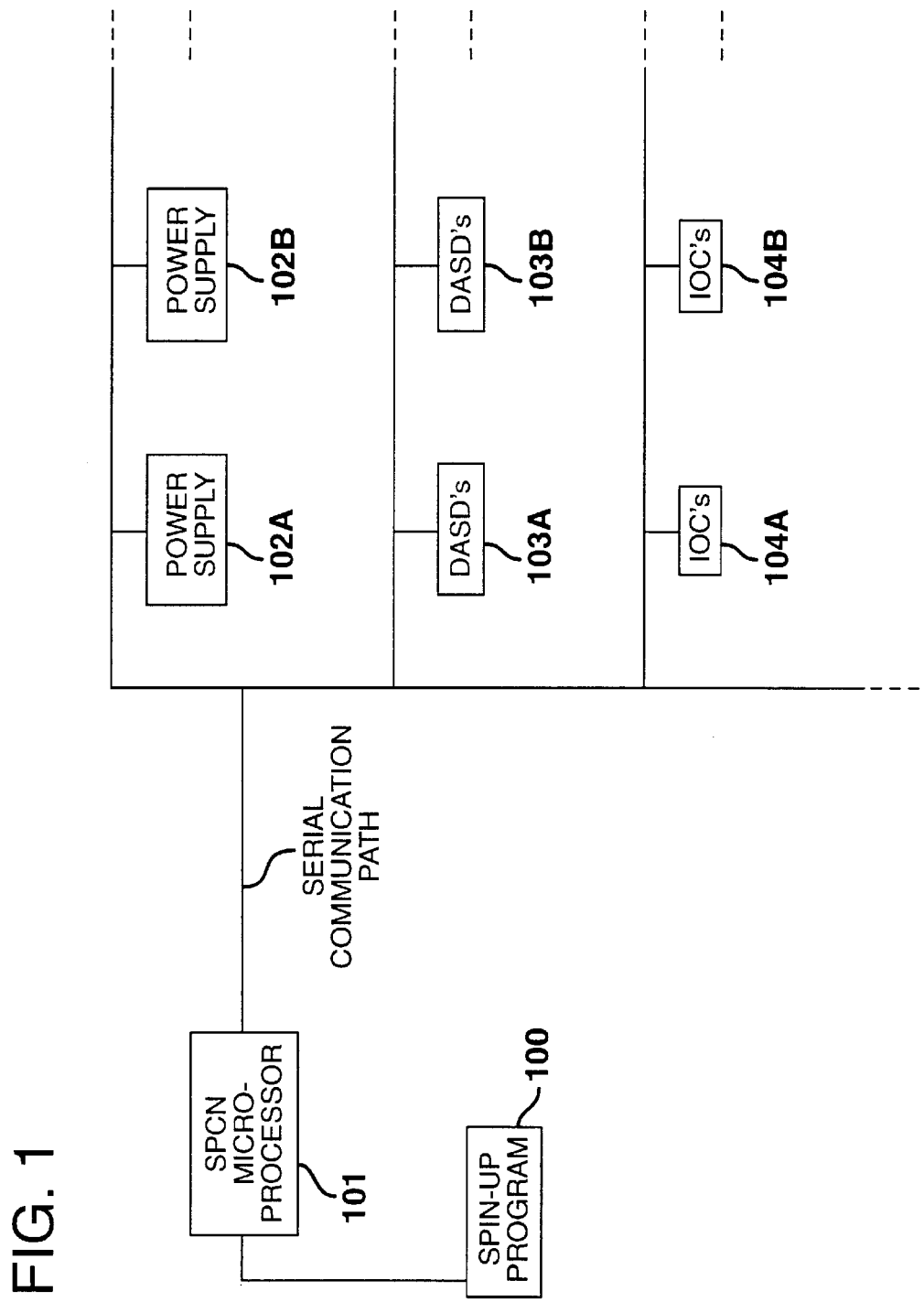

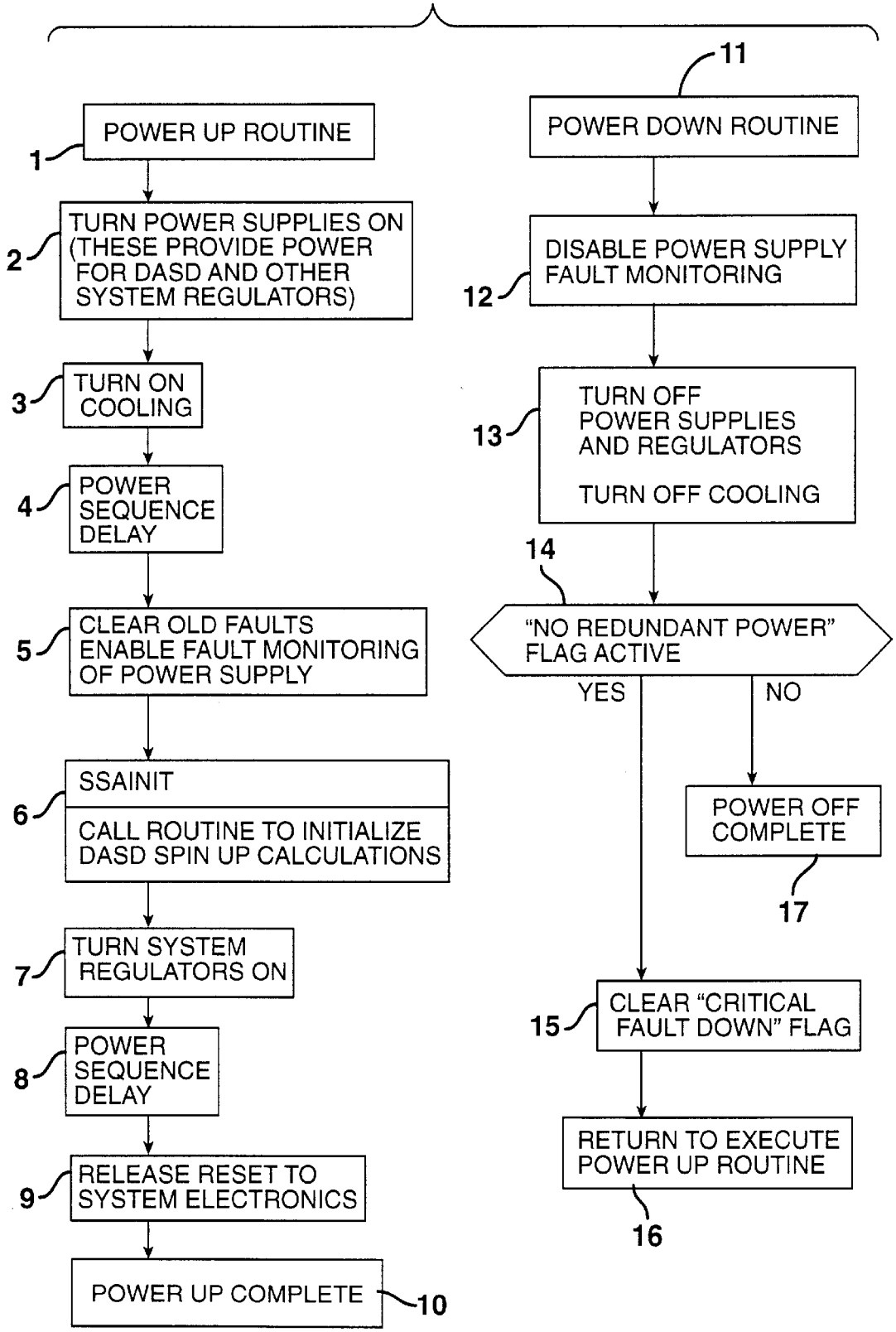

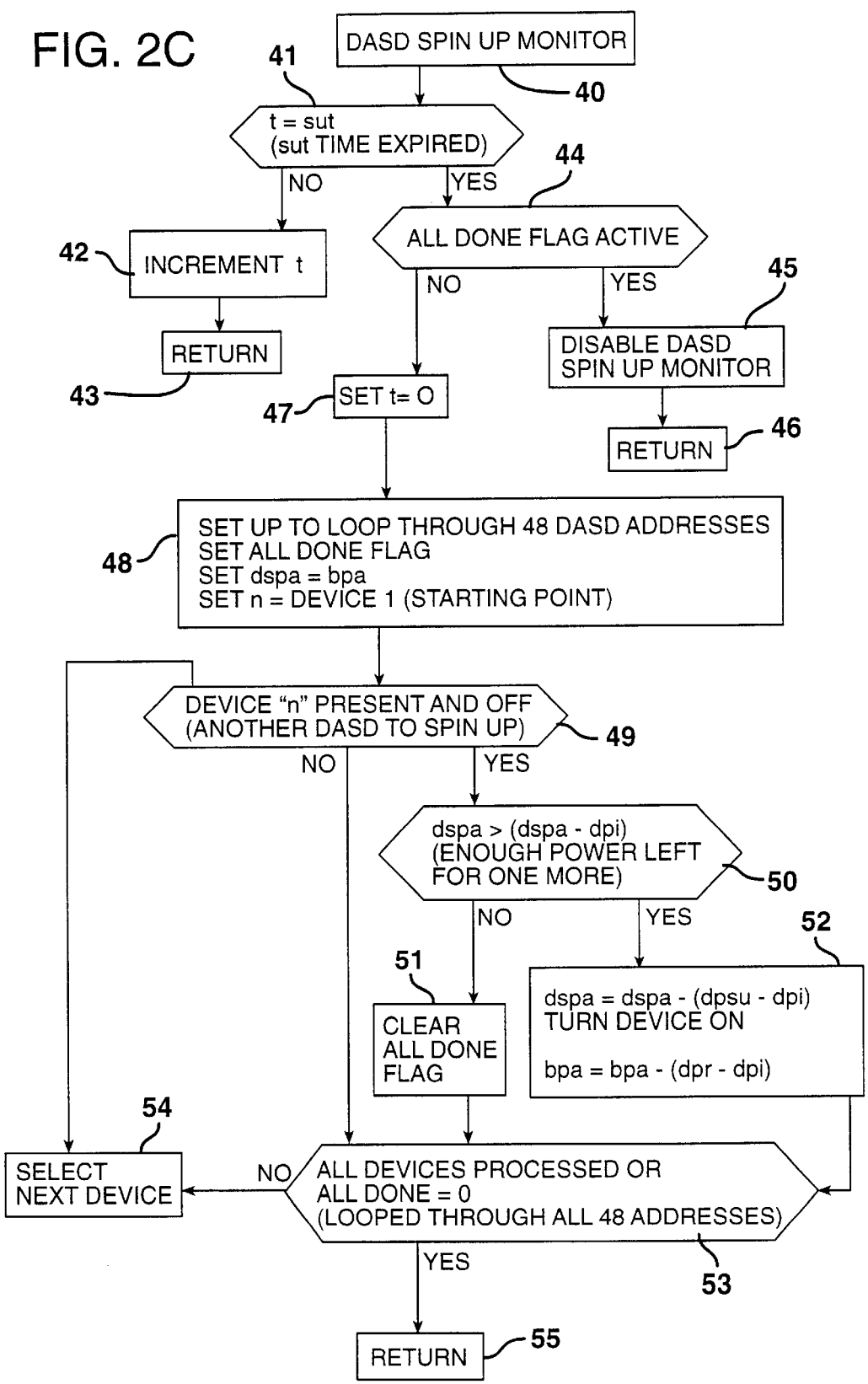

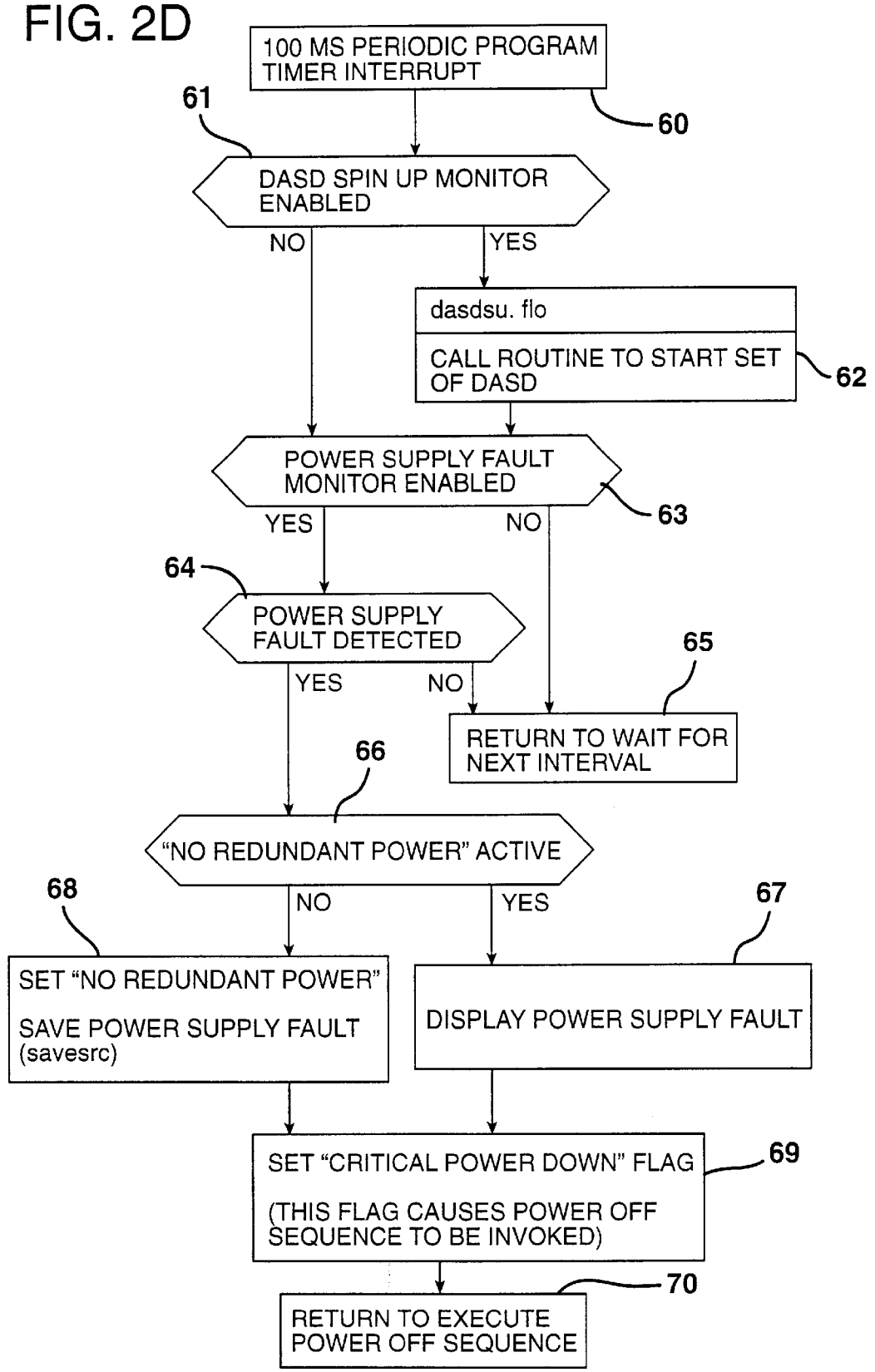

TABLED PARMS FOR DASD SPIN-UP dpi = DASD POWER AT IDLE = 1W dpr = DASD POWER RUNNING = 19W dpsu = DASD POWER SPIN UP = 42W sut = SPIN UP TIME = 9 SEC bp = POWER PER POWER SUPPLY = 650W lp = LOGIC POWER NOT AVAILABLE
     TO START DASD ndp = NUMBER OF DEVICES PRESENT bpa = POWER AVAILABLE TO RUN DASD, CALC dspa = DASD SPIN UP POWER AVAILABLE t = COUNTER USED TO COUNT OFF
    SPIN UP TIME

SMART DASD SPIN-UP

BACKGROUND OF THE INVENTION

1. Field of The Invention

The invention relates to the field of computer system power management, and in particular, to managing the powering-up or "spin-up" of direct access storage devices (DASD's, i.e., disk drives) in a computer system.

2. Background Information

Computer system start-up time, also referred to as initial program load (IPL) time, is determined in part by the time it takes to start direct access storage devices (DASD's), i.e., disk drives. DASD's have a significant so-called "spin-up" time to start and get their motors up to a nominal speed (disk operating rpm). During this spin-up time, the DASD's are drawing significantly more power than during their steady-state, i.e., when their motors are already running and the disks are spinning at their nominal operating rpm. This power required to start and spin-up a DASD to nominal operating rpm, the DASD power for spin-up, will be referred to herein as "dpsu", and the DASD power while running will be referred to as "dpr." The spin-up time will be referred to as "sut" herein.

The dpsu, the power required to start the DASD motors and get the disks up to a nominal rpm, can be approximated well by a square pulse of power for time sut. Once the motors are turning (steady-state operation) they require less power, i.e., dpr, and this difference is due in part to inertial and electrical effects, as one skilled in the art would readily appreciate. An exemplary DASD sut is about 9 seconds, and an exemplary dpsu is about 42 watts. An exemplary running power, dpr, is about 19 watts.

The DASD's also use a relatively small amount of power when their electronic circuits are powered-up, but their motors are not running, i.e., the DASD power when idle, referred to herein as "dpi." An exemplary dpi is about 1 watt.

To recap, when power is first applied, a DASD consumes dpi watts until the motor is turned on, then for a period of time, it consumes dpsu watts during spin-up. After that, the DASD consumes dpr watts until the motor is turned off.

Because of the power required to spin-up the DASD's, typically, DASD spin-ups have to be staggered so as not to cause a problem by exceeding the power supply capabilities of the computer system. An exemplary computer system power supply provides about 650 watts. (Although a typical mid-range to high-end computer system also has at least one redundant/backup power supply as well as the primary power supply, this backup power is only used upon failure of the primary power supply.) The DASD's are started sequentially under the control of their input/output controllers (IOC's), and only enough power is provided to start a few DASD's at once beyond the maximum load. However, this solution requires considerable time to start the DASD's.

An alternate solution to the power problem is to provide enough power supply capability in the computer system to start all of the DASD's at once. However, this adds to the overall cost of the system, especially where the system has redundant/backup power supplies which also must be sized larger. Taking the exemplary values above, with 48 DASD's, a primary power capability of over 2,000 watts might be required just to start all the DASD's at once, not to mention also running system electronics. Of course, besides costs involved with manufacturing larger power supplies, there are the related costs of extra cooling and space requirements, as well as greater overall energy use of a computer system so equipped.

Another factor is that the DASD spin-up until now has been under control of the DASD input/output controllers (IOC's). The staggered startup routine currently in use by the IOC's has at least two limitations. First, it uses a linear method of starting the drives; where several time intervals are used to start the drives, and a set number of drives are started in each interval. This method is limited by the number of drives that can be started in the last time interval. To simplify the IOC controlled spin-up routine, a fixed number of DASD's are started every X seconds. Of course the fewer started every X seconds, the longer it takes to get them all going. As more and more drives are started, their steady-state power usage takes more and more of the power available from the power supply. This means that less power is available to start another drive. When down to the last few drives remaining to be started, there has to be enough power available to start the remaining drives. Since it takes more power to start a drive than to maintain it, unless there is substantial excess power, then there may only be enough power left at the end to start one drive at a time. (This would be the case if there had been as many drives installed in the system as the power supply could support.)

A second limitation is that the DASD controllers (IOC's) have limited information on how much power is required to spin-up and run a DASD, and how much power is actually available in the computer system. The controller may have some rudimentary information about the type of drive it is controlling, but it probably does not know the specific power requirements of each particular type of DASD connected to it. The IOC, therefore, would be programmed to assume the parameters for the worst case DASD's that could be attached. This information would be stored on-board the controller.

Likewise, the controllers may have some limited information about the possible power supply capabilities, which however, may vary substantially from system to system.

Consequently, the IOC's must be programmed to implement a worst case algorithm for DASD start up, based on the highest power DASD's and the lowest capacity power supplies, in order to guarantee they do not exceed power supply capacity and cause a power fault. Clearly, this will sometimes result in large inefficiencies, since the worst case assumption does not take into account the actual power capabilities and requirements of a particular computer system.

In addition, where DASD spin-up is controlled by the IOC's, the DASD spin-up cannot even begin until the IOC has completed its own reset and initialization at IPL. As should be readily apparent, the time involved in a system with a large number of DASD's and IOC's can add up is quickly, resulting in significant time lost during IPL.

For example, assume the controller performs the spin-up, and assume spin-up cannot start until the controller is reset and it performs its initialization. The controller initialization process might require 10 seconds and then, if 3 drives were started every 9 seconds, for example, then 48 drives would require 16×9=144 seconds. However, the initialization does not start until the reset is removed, which also requires a finite amount of time. Just getting the DASD's spun-up, therefore, may take in excess of 2.5 to 3.0 minutes in a typical system. Since system processor performance is measured in mega-flops and even terra-flops per second (a "flop" is a floating point operation), considerable processing time may be lost.

As mentioned above, the IOC's implement a worst case routine, assuming the lowest capabilities for the power supplies and the highest power requirements for the DASD's. As a result, the prior process of starting the DASD's clearly will generally not result in maximum efficiency because the actual system may have, and probably will have, hardware quite different from the worst case situation.

Therefore, in view of the above, a need has existed for a better way to handle DASD spin-up to overcome the disadvantages in the prior process.

There is also known a system power control network (SPCN) which is disclosed in U.S. Pat. No. 5,117,430, for example. The SPCN was designed as a low volume serial network used to monitor power conditions at a plurality of interconnected nodes in a computer system, in particular, the IBM AS/400 (IBM and AS/400 are registered trademarks of International Business Machines Corporation).

Improvements in the SPCN are disclosed in co-pending applications Ser. Nos. 08/912,561 and 08/912,403, allowed Nov. 1, 1999 and U.S. Pat. 5,935,252, issued Aug. 10, 1999, for example.

The SPCN may include one or more microprocessors which monitor the status of, and make occasional adjustments to, the power conditions at the respective computer system nodes. At system start-up (IPL), the SPCN microprocessors are able to quickly gather computer system configuration information ahead of and independently of the computer system main communication paths.

SUMMARY OF THE INVENTION

It is, therefore, a principle object of this invention to provide a method and apparatus for performing a smart DASD spin-up.

It is another object of the invention to provide a method and apparatus that solves the above mentioned problems resulting in DASD Spin-up being accomplished more quickly and efficiently, and lowering overall system cost.

These and other objects of the present invention are accomplished by the method and apparatus disclosed herein.

According to an aspect of the invention, a system power control network is used to control DASD spin-up.

According to an aspect of the invention, the system power control network determines at initialization (IPL), both the number of DASD's present in the system and their power requirements, as well as the power supply capabilities of the system.

According to another aspect of the invention, the time to complete he system initialization (IPL) is reduced by starting a maximum number of DASD's possible at once using the actual power capabilities available.

According to another aspect of the invention, the starting of the DASD's is done in stages. In the first stage, since no DASD's are yet started, all of the available power can be used to start a first group of DASD's. That is, in the beginning of the startup sequence when few of the DASD's are started, the power allocated in the system design for operation of the non-started DASD's is used to start other DASD's, and therefore, a maximal number of DASD's are started at once. In later stages, since more DASD's are running and drawing power, fewer DASD's can be started at one time. The power used by the running DASD's is subtracted from the pool of available power for starting further DASD's in subsequent iterations.

Advantageously, the startup according to the present invention also takes advantage of the power available in redundant power components (supplies) for starting DASD's. Further, if a redundant power component is not available or defective, the startup is dynamically altered to start only as many DASD's at once as the power system can support so that the system continues to successfully power-on in spite of defective redundant components. In addition, the system will be able to power-on successfully even with defective non-redundant, i.e., primary, components if the power available from operational power supplies, redundant and non-redundant is sufficient to start the number of DASD's installed.

According to another aspect of the invention, the DASD spin-up power is approximated by a square pulse of power for a spin-up time, "sut," and the DASD spin-up power available, "dspa" is computed and divided by the power to spin-up one DASD, "dpsu," to determine the maximum number of DASD's which may be started at once. This can be implemented simply by an iterative loop that starts with the power available (dpsa) and repetitively subtracts the power needed to spin-up one DASD (dpsu) until no more power is available. Steady-state operation requires a smaller power (dpr). For each DASD started, the bulk power available for steady-state operation (bpa) is computed by subtracting the steady-state operating power (dpr) for each DASD started from the bulk power available, also considering the power of each idle not started DASD (dpi). This value becomes the power available to start the next group of DASD's after "sut" expires for the first group. This process can be repeated until all DASD's are started.

According to another aspect of the invention, the power available in functioning redundant/back-up power supplies in the system is made available for the DASD spin-up. The system power control network includes redundant/back-up power supplies in determining the total available power. The system power control network checks that primary power supplies are functional as well, in determining the power available for DASD spin-up.

These and other aspects of the invention will become apparent from the detailed description set forth below.

BRIEF DESCRIPTION OF THE DRAWINGS

FIG. 1 illustrates a block diagram of a system power control network coupled to control DASD spin-up according to an exemplary embodiment of the present invention.

FIGS. 2a to 2d illustrate a flow chart of a process according to an exemplary embodiment of the invention, while FIG. 2e illustrates a table of parameters used in the exemplary process.

DETAILED DESCRIPTION OF THE PREFERRED EMBODIMENTS

Figure 2B:
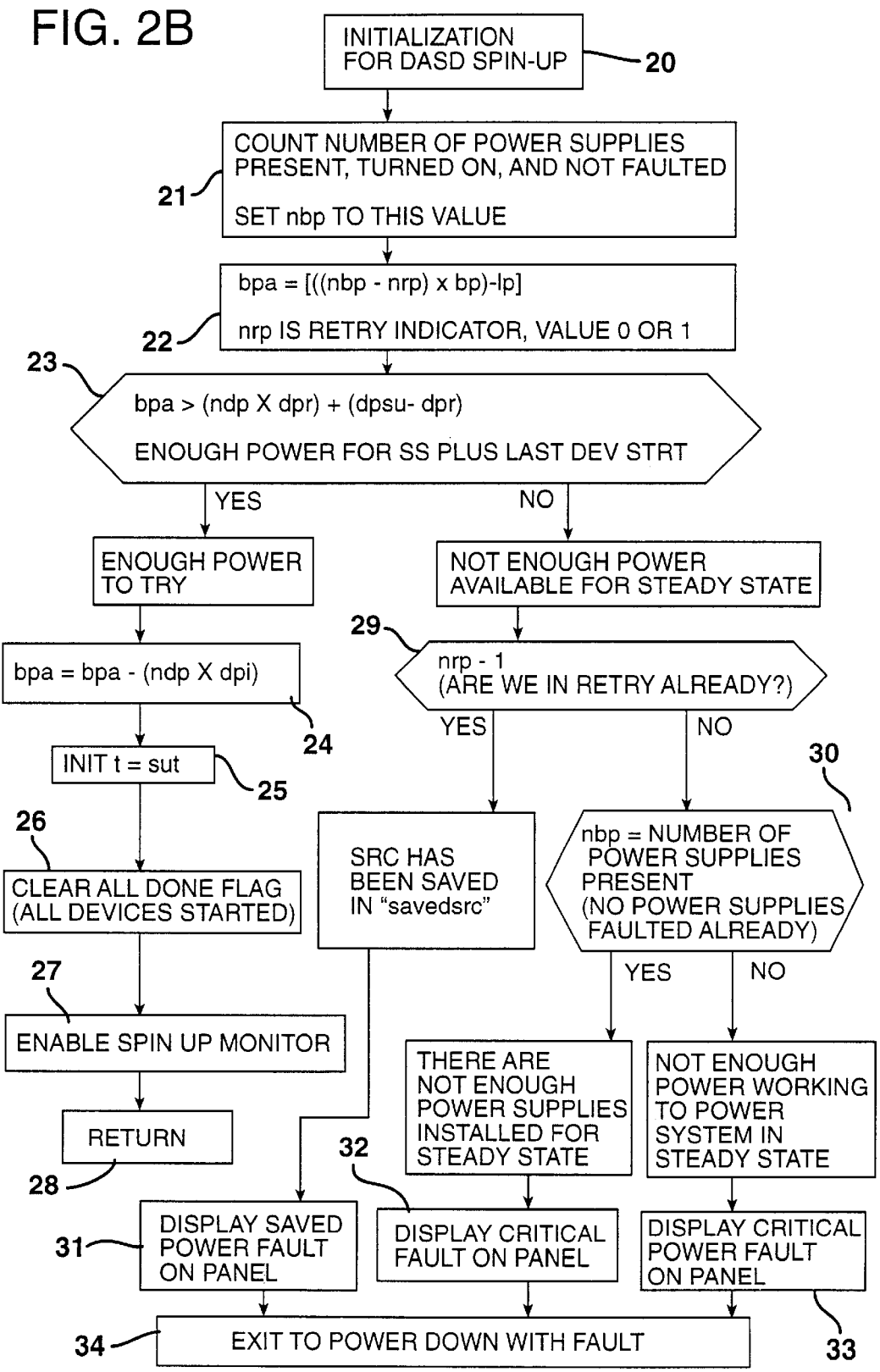

The invention will now be described in more detail by way of example with reference to the embodiments shown in the accompanying figures. It should be kept in mind that the following described embodiments are only presented by way of example and should not be construed as limiting the inventive concept to any particular physical configuration.

FIG. 1 illustrates a block diagram of a system power control network microprocessor (SPCN) 101 coupled to control DASD spin-up according to an exemplary embodiment of the invention using spin-up program 100. The spin-up program 100 may be embodied as a "computer program product," described in more detail below. The SPCN microprocessor 101 is coupled to power supplies 102A, 102B . . . , DASD's 103A, 103B . . . , and IOC's 104A, 104B, . . . As will be described in detail below, the SPCN controls DASD spin-up at system IPL. To accomplish this, the SPCN microprocessor 101 has knowledge about the number of power supplies 102A, 102B, . . . , their capabilities and their status. In particular, the SPCN microprocessor 101 knows what the power capacity is of each power supply in the system, whether the power supply is operational, and what the power requirements of the DASD's 103A, 103B . . . , the IOC's 104A, 104B, . . . , and the other system components (not shown) are. The SPCN microprocessor 101 can, therefore, determine the power available from the power supplies 102A, 102B, . . . , for initiating DASD spin-up at IPL. Some of the power supplies would be primary power supplies and some would be redundant/ backup power supplies in a typical computer system. SPCN microprocessor 101 can advantageously use the redundant/ backup power supplies to provide additional power to implement DASD spin-up. Further, as will be described later in more detail, the SPCN microprocessor 101 can initiate DASD spin-up while the IOC's 104A, 104B, . . . , are still being reset, so that the DASD's spin-up can begin earlier, and so that the IOC's and the DASD's can go on-line almost simultaneously. It should be understood that FIG. 1 is merely a schematic representation of one exemplary embodiment of a system configured according to the present invention, and that a number of variations are possible within the spirit of the invention. The lines coupling the power supplies, DASD's and IOC's are not shown to simplify illustration in FIG. 1.

FIGS. 2a to 2d illustrate a flow chart of a process implemented according to an exemplary embodiment of the invention. FIG. 2e illustrates a table of parameters used in the exemplary process.

Referring to FIG. 2a, and blocks 1 to 17, a power-up and a power-down routine are illustrated. In block 1, a power-up sequence for the system is started. In block 2, the power supplies are turned on. These power supplies provide the power to run the DASD's. They do not necessarily power all the electronics within the system. In block 3, the cooling fans are turned on. In block 4, a power sequence delay is inserted to wait for the power supplies to come on. In block 5, because this is a new attempt to power-up, old faults are cleared and the fault monitor is enabled. In block 6, the initialization routine is called to determine DASD start up parameters. In block 7, the system regulators are turned on. These are not necessary to an understanding of the invention and are merely shown for illustrative purposes only. These regulators convert the voltage from the power supplies to the various levels required by other system components. In block 8, another power sequence delay is invoked to wait for the regulators to power on. In block 9, the resets are removed from the electronics, i.e., the processors, memory and device controllers to allow them to initialize and start operation. In block 10, the power-up sequence is completed. Once the power-up sequence is complete, the system is operational until some event causes a power-down sequence to be executed.

A power-down sequence is initiated if a power-off switch is pressed, or if a power fault causing loss of system power occurs, for example. Block 11 is the start of a power-down sequence. In block 12, since power supplies are to be turned off, the fault monitors have to be disabled. In block 13, power supplies, regulators, and cooling are turned off. In block 14, the "no redundant power" flag is tested. This flag is set if a power fault occurs during a power-up cycle. This power fault may be due to starting too many DASD's at once, for example. In block 15, if the "no redundant power" flag was set, then the "critical fault down" flag is cleared. This will allow another power-up attempt to be executed automatically following the completion of this power-down cycle. In block 16, the power off cycle is completed and on this path, the power-up routine in block 1 will be started immediately. In block 17, if the "no redundant power" flag is not active, then the power off cycle is complete. The system remains off until the user initiates a power on operation.

With reference to FIG. 2b, and blocks 20 to 34, a first portion of the DASD spin-up procedure according to an exemplary embodiment of the invention, is illustrated. Reference should also be made to FIG. 2e, which illustrates a table of the parameters used in the exemplary method stored in SPCN memory 201, for example. In block 20, the initialization of the DASD spin-up begins. In block 21, the number of bulk power supplies present, turned on, and not faulted is counted, and "nbp" is set to this value. If a power supply has already failed in the power-up sequence delay, then it is not counted because it cannot contribute to the power to start the DASD's.

In block 22, the power available to start the DASD's (bpa) is calculated as the number of bulk power supplies present, on and not faulted (nbp) times the power output of each power supply (bp), adjusted as now described. If the "no redundant power" flag (nrp) is set, then one is subtracted from the number of power supplies that can contribute; if not, then nrp is zero. The nrp is a retry indicator taking a value of one or zero. This value must be subtracted initially because the power supply may not fault until the load of starting the DASD's is placed on the power supplies. Also, the power that is required to run the other components in the system must be subtracted from the total available to determine the mount remaining for just the DASD's. That is, the logic power (Ip) is also subtracted from the total power available.

In block 23, the power available (bpa) is compared to the amount of power required to run the DASD's in the steady-state (nbp×dpr) plus the power differential to start (spin-up) the last DASD, that is, the difference between the spin-up power (dpu) and the steady-state running power (dpr). This calculation does two things. First, it confirms that enough power exists to operate the DASD's in the steady-state, notwithstanding the power required in starting them. Second, it confirms that sufficient power is available for the steady-state plus enough power to start the last DASD. This differential (dpsu-dpr) is required because, as already noted, it takes that much more power to start a DASD (dpsu) than to run it in the steady-state (dpr).

Flow branches to block 24 if there is enough power to try, as determined in block 23. In block 24, the bulk power available for spin-up (bpa) is set to be the bulk power available (bpa) minus the power being used by the DASD's at idle (ndp×dpi), i.e., before their motors are started. The "ndp" is the number of DASD's present in the system.

In block 25, a timer that is used to measure the cycle time for spin-up (t) is initialized to its limit value sut (spin-up time) to cause the spin-up routine to be executed immediately (FIG. 2c, block 41, described later). Since at this point, no DASD's have been started yet, the spin-up routine is started immediately.

At block 26, the "all done" flag is cleared in preparation for the spin-up routine. In block 27, the spin-up monitor is enabled to start DASD's (FIG. 2c). In block 28, the spin-up initialization is completed, and flow returns to the power up routine from which it was called.

However, when in block 23, it is determined that sufficient power is not available to run the DASD's in the steady-state, flow goes to block 29 where the "no redundant power" flag is tested to see if a power-up retry attempt is underway. If not (NO), then flow goes to block 30, where the nbp parameter, set in block 21 to the number of power supplies present, turned on and not faulted, is compared with the number of power supplies present. This determines if a power supply has already faulted. This test allows differentiation between two cases, and these will be explained later.

If, in block 29, a power-up retry is underway and has failed (YES), then the power supply fault saved earlier (src) is the cause of the failure, and flow branches to block 31.

Returning to the decision of block 30, if the failure is caused by too many DASD's installed for the amount of power supplies, flow goes to block 32. If the failure is caused by a failed power supply, then flow goes to block 33.

After blocks 31, 32, or 33, the routine completes at block 34 with a failure: "power-down with fault."Turning now to FIG. 2c, blocks 40 to 55, when the spin-up monitor is enabled (from block 27), it begins here. In block 41, the timer (t) is compared to the spin-up cycle time (sut). When the comparison result is true (equal), the next set of DASD's can be processed (spun-up). If the comparison is not true, then flow goes to block 42 then block 43, i.e., if the cycle time has not been reached, then the timer is incremented and this call of the spin-up monitor is complete.

When the comparison result is true (equal) in block 41, and therefore, the next set of DASD's can be processed (spun-up), flow proceeds to block 44, where the All Done Flag is tested. If the All Done flag is set, then flow goes to block 45, spin-up is complete, and the spin-up monitor is disabled, then the flow exits at block 46.

However, if the All Done flag is not set, flow goes to block 47, where the timer is reset to count out the next interval. In block 48, a loop (the loop of blocks 49 to 54) is initialized to cycle through all possible DASD addresses, in this example, 48 addresses. The All Done flag is set in anticipation of completing all DASD's. The power to start DASD's (dpsa) is set to the current value of bulk power available (bpa). The loop control (n) is initialized to start with the first DASD.

At block 49, DASD position n is examined and if a DASD is present and off (YES), then the power calculations are tested in block 50. However, if the DASD is not present or is already turned on, then the loop limit (n=48 in this example) is tested to see if all DASD's have been processed in block 53. The All Done flag is also tested here, as will be explained later.

In block 50, dspa (DASD spin-up power available) is compared to the additional power required to start one DASD, i.e., the spin-up power (dpsu) minus the idle power (dpi). If dspa is sufficient to spin-up one more DASD, then this DASD is turned on in block 52. If sufficient power for this DASD does not exist, then flow goes to block 51, where the All Done flag is cleared, which is detected in block 53, causing loop exit at block 55. Another pass will be required after the current set of DASD's have been started (spun-up), and more power is then available.

After all DASD positions, e.g., 1 to 48, have been cycled through, the routine exits at block 55 until the timer again matches at block 41, i.e., in another sut seconds. In this example, sut is 9 seconds.

In block 52, the difference between the DASD spin-up power and the DASD idle power, i.e., dpsu-dpi, is subtracted from the DASD spin-up power available (dspa). This new value of dspa becomes the power available to start the next DASD. Then the DASD is started and the steady-state power remaining is calculated. Once the DASD is started, it will require an additional power equal to its steady-state power (dpr) minus the idle power (dpi). This value is subtracted from bpa (bulk power available) and this value becomes the power available to start the DASD's which are not started in this the present invocation of the spin-up monitor.

It is noted that the idle power dpi is subtracted from the DASD power for spin-up (dpsu) and the DASD power running (dpr) in these calculations because dpr and dpsu represent the total power a DASD uses when running or spinning-up, respectively, i.e., the idle power is inherent in these values. What is of interest is the additional power required for spin-up. Looked at another way, in block 24 the total idle power (ndp×dpi) was subtracted from the bulk power available bpa, and the DASD spin-up power available dspa was set to bpa in block 48. Therefore, the DASD's idle power has already been subtracted out of the total power available for spin-up and should not be subtracted out again. At block 54, if not done as determined in block 53, the next DASD is selected and flow returns to block 49.

Turning next to FIG. 2d, blocks 60 to 70, a periodic timer is used to kick off a fault monitor and the spin-up monitor. In this example, the periodic program timer interrupt is 100 ms as shown in block 60. If the spin-up monitor is enabled as determined in block 61, then the spin-up routine is called at block 62. The spin-up monitor was discussed relative to blocks 40 to 55.

If the power supply fault monitor is enabled as determined by block 3, then detection of power supply faults is tested in block 64. If the power supply fault monitor is not enabled, or no power supply faults are detected, then in block 65, the routine exits until the next timer interrupt.

If a power supply fault is detected in block 64, then the "no redundant power" flag is tested in block 66. If the flag is set, then this is the second attempt and a power supply must be repaired. The detected power fault is displayed in block 67.

If the flag is not, set then this is the first power up attempt. Flow goes to block 68 where the "no redundant power" flag is set so that the amount of power to start the DASD's will be adjusted and a fewer number of DASD's will be started at each cycle. The power supply fault report is saved (savesrc).

At block 69, the "critical power down" flag is set to force a power off cycle, i.e., the power off sequence is started. Even though the power has failed, a power off sequence is necessary to properly power off all components before another power up cycle is attempted. The routine exits at block 70.

Exemplary tabled parameters for DASD spin-up are listed in FIG. 2b. Using the exemplary numbers on the flow charts, 42 DASD's can be started essentially simultaneously on the first attempt. Nine seconds later, the remaining 6 (of 48) can be started. If these are started 10 seconds before the controller reset is removed, then the effective time to start all the drives beyond the controller reset is 8 seconds (9+9−10). This is compared with the 144 seconds (plus controller reset time of about 10 seconds) in the prior process. Therefore, over two minutes of start up time will have been saved in this example.

Using the system power control network (SPCN), the ability to start to spin-up the DASD's essentially as soon as power is turned on to the system, and before all the power up sequencing (FIG. 2a) is completed for the rest of the computer system components, is also achieved. The DASD's essentially come on-line in parallel with the controllers.

Using SPCN with its information about the state of the power supplies in the system, permits using both the primary and redundant/backup power supplies for the power required for spin-up. Before, in the prior process using the DASD IOC's, this was not possible, since the IOC's had no knowledge about the state of the system power supplies.

In a system with a 650 watt redundant/backup power supply, for example, an extra 650 watts are available for DASD spin-up, assuming that the primary and redundant/backup power supplies are operational. In the prior solution where enough power was provided to spin-up all DASD's at once, using the example above with 48 DASD's and 42 watts to spin-up a DASD, primary power supplies having in excess of 2,016 watts would have been required since the redundant/backup power supply was not utilized for DASD spin-up. Using the redundant/backup power supply for DASD spin-up can, therefore, significantly reduce the costs associated with power supplies for the system.

Returning briefly to FIG. 2b, block 22, where the retry indicator (nrp) is subtracted from the number of bulk power supplies (nbp), some further explanation is now provided. The retry indicator is set when the system failed to power up because it tried to start too many DASD's at once. That happens, for example, when one of the power supplies was defective and this was not known when power on was attempted. The resulting over-current could not be handled by the other working power supplies, and therefore, the power up attempt failed. However, the power controller is smart enough to realize this, and thus will attempt a retry of the power on cycle. But this time, the retry indicator is set so that all the present power supplies are not counted, i.e., one is subtracted from nbp. This will result in less power being determined to be available to start devices, and as a result, a smaller number will be started at once, therefore this attempt might be successful. This is an advantageous feature because one benefit of a redundant power supply is to be able to use the system in spite of a power supply failure. However, starting the DASD's according to the description above has made use of the now failing redundant power supply and has caused the system to fail to power on. Therefore, the aggressive spin-up must be backed away from, and a slower start up, with only the functioning power supplies attempted.

Earlier, reference was made to an essentially non-sequential method of starting the DASD's, and to starting the maximum number of DASD's at once. By this it is meant that a maximal group of DASD's are started essentially at the same time. The number of DASD's in this maximal group is determined by the amount of power available, as described above. While the exemplary embodiment described an iterative loop where one DASD is turned-on each pass through the loop until insufficient power remains for another DASD, because there are only microseconds involved in each pass through the loop, the DASD's started are started essentially at the same time, relative to the about 9 seconds it takes to spin-up a DASD. The loop is being executed by the SPCN processor at high speed. However, other implementations of the invention could be envisioned by one skilled in the art that do not use an iterative loop as described above in which one DASD is started each pass of the loop, but where all the DASD's in the maximal group are actually signaled to turn on in parallel. Such modifications would be considered to be encompassed by the invention disclosed herein.

Earlier, it was noted that the spin-up program 100 may be embodied as a computer program product. The computer program product includes a recording medium, such as a floppy disk, a high-capacity read only memory in the form of an optically read compact disc or CD-ROM, a tape, a transmission type media, such as a digital or analog communications link, or a similar computer program product.

It will be apparent to one skilled in the art that the manner of making and using the claimed invention has been adequately disclosed in the above-written description of the preferred embodiments taken together with the drawings.

It will be understood that the above described preferred embodiments of the present invention are susceptible to various modifications, changes, and adaptations, and the same are intended to be comprehended within the meaning and range of equivalents of the appended claims.

For example, while the invention has described with respect to an embodiment where the power related to starting DASD's in a computer system is the concern, it will be appreciated that the invention is applicable to maximizing power supply design and efficiency for any device which requires power at system startup.

What is claimed is:

1. In a computer system having at least one main communications path, a system power control network providing a power control path independent of the at least one main communications path, a plurality of system devices including direct access storage devices, direct access storage device controllers, and at least one power supply, a smart direct access storage device spin-up system comprising:

a system power control network processor coupled to independently control and monitor the computer system direct access storage devices and the at least one power supply with the system power control network, and having and executing a program and being operational at computer system initialization to independently:

determine, using the system power control network, system device power requirements and system power supply capabilities;

based on the determining, calculate a maximal number of direct access storage devices which can be started at one time; and start the maximal number of direct access storage devices calculated before the computer system initialization has completed initialization of the direct access storage device controllers.

2. An article of manufacture comprising a computer program product, the computer program product comprising means for causing a a system power control network processor to provide a method of controlling computer start-up;

wherein the method of computer startup comprises:

independently controlling and monitoring system devices including direct access storage devices, direct access storage device controllers, and devices and at least one power supply of the computer with a system power control network processor and a system power control network which has a communications path independent of a main communications path of the computer;

determining, using the system power control network processor, system device power requirements and system power supply capabilities;

based on the determining, calculating a maximal number of direct access storage devices which can be started at one time using the system power control network processor; and starting the maximal number of direct access storage devices calculated using the system power control network processor before computer start-up has completed direct access storage controller initialization.

3. A computer-based method of automatically controlling an electrical system start-up using a system power control network processor and a system power control network which provides a communications path independent of main system communication paths, the electrical system having a plurality of devices and associated controllers, comprising:

independently determining with the system power control network processor, system device power requirements and system power supply capabilities;

based on the determining, calculating using the system power control network processor a maximal number of devices which can be started at one time; and based on the calculating, starting the maximal number of devices using the system power control network processor before start-up of the associated controllers has been completed.

4. The method according to claim 3, wherein the electrical system comprises a computer system and wherein:

the determining with the system power control network processor includes determining power requirements of direct access storage devices;

the calculating includes calculating a maximal number of direct access storage devices which can be started at one time; and the starting includes starting the maximal number of direct access storage devices calculated.

5. The method according to claim 3, wherein:

the determining with the system power control network processor includes determining primary and back-up system power supply capabilities.

6. The method according to claim 5, wherein the determining with the system power control network processor further includes:

determining with the system power control network processor how many power supplies are present, turned on, and operating without fault.

7. The method according to claim 3, wherein, based on the determining with the system power control network processor, the calculating a maximal number of devices which can be started at one time and the starting the maximal number of devices calculated, includes executing the following steps while devices remain to be started:

calculating the power available to start devices;

comparing the power available to start devices to the power required to start one device;

if, based on the comparing, adequate power is available to start one device, then starting one device, otherwise waiting a period of time and then returning to the calculating step;

recalculating the power available to start devices by subtracting the power used in the starting of the one device;

if devices remain to be started, then returning to the comparing step, otherwise exit.

8. The method according to claim 7, wherein the electrical system comprises a computer system and wherein the determining system device power requirements and system power supply capabilities with the system power control network processor includes determining primary and back-up system power supply capabilities, determining how many power supplies are present, turned on, and operating without fault, and determining power requirements of direct access storage devices.

9. The method according to claim 8, wherein the system devices comprise direct access storage devices and wherein determining system device power requirements with the system power control network processor includes determining direct access storage device spin-up power as approximated by a square pulse of power for a spin-up time.

10. The method according to claim 9, wherein the calculating the power available to start devices includes, for each direct access storage device started, subtracting a steady-state operating power from the system power supply capabilities.

11. The method according to claim 10, wherein the waiting a period of time comprises waiting a nominal direct access storage device spin-up time.

12. The method according to claim 11, wherein a direct access storage device idle power is included in the calculating.

13. The method according to claim 12, wherein the direct access storage device idle power is approximately 1 watt, wherein the nominal spin-up time is approximately 9 seconds, wherein the steady-state operating power is approximately 19 watts, wherein the device spin-up power is approximately 42 watts, wherein the primary power supply capability is approximately 650 watts, and wherein the back-up system power supply capability is approximately 650 watts.

14. A computer program having a plurality of program steps to be executed on a system power control network processor to implement and control computer system start-up according to the method of claim 13.

15. An apparatus for performing the method according to claim 13, comprising:

first means in the system power control network processor for determining system device power requirements and system power supply capabilities;

second means in the system power control network processor for calculating, based on the results produced by the first means for determining, a maximal number of devices which can be started at one time; and third means in the system power control network processor for starting the maximal number of devices calculated.

16. The apparatus according to claim 15, wherein the first, second and third means in the system power control network processor comprise a microprocessor coupled to system devices and system power supplies via a system power control network medium and executing a program to thereby implement the method of computer system start-up.

17. The apparatus according to claim 16, wherein the system power control network medium comprises a serial communications path.

18. An apparatus for performing the method according to claim 3, comprising:

first means in the system power control network processor for determining system device power requirements and system power supply capabilities;

second means in the system power control network processor for calculating, based on the results produced by the first means for determining, a maximal number of devices which can be started at one time; and third means in the system power control network processor for starting the maximal number of devices calculated.

19. The apparatus according to claim 18, wherein the electrical system is a computer system, and wherein the first, second and third means in the system power control network processor comprise a microprocessor coupled to system devices and system power supplies via a system power control network medium and executing a program to thereby implement the method of computer system start-up.

20. A computer program having a plurality of program steps to be executed on a system power control network processor to implement and control computer system start-up according to the method of claim 3.

* * * * *